US012233563B2

(12) United States Patent
Gassman et al.

(10) Patent No.: US 12,233,563 B2
(45) Date of Patent: Feb. 25, 2025

(54) HAIR CLIPPER ATTACHMENT COMB WITH ENHANCED HAIR FLOW GEOMETRY

(71) Applicant: WAHL CLIPPER CORPORATION, Sterling, IL (US)

(72) Inventors: George William Gassman, Dunlap, IL (US); Steven Wayne Arndt, Geneseo, IL (US); Marcus Willi Karl Gerhard Bosch, Belding, MI (US)

(73) Assignee: WAHL CLIPPER CORPORATION, Sterling, IL (US)

( * ) Notice: Subject to any disclaimer, the term of this patent is extended or adjusted under 35 U.S.C. 154(b) by 266 days.

(21) Appl. No.: 17/820,080

(22) Filed: Aug. 16, 2022

(65) Prior Publication Data

US 2024/0058974 A1 Feb. 22, 2024

(51) Int. Cl.
*B26B 19/20* (2006.01)
*B26B 19/06* (2006.01)
*B26B 19/38* (2006.01)

(52) U.S. Cl.
CPC .............. *B26B 19/20* (2013.01); *B26B 19/06* (2013.01); *B26B 19/3813* (2013.01)

(58) Field of Classification Search
CPC ..... B26B 19/20; B26B 19/06; B26B 19/3813; B26B 19/38; A45D 26/00
USPC .... 30/200, 43.92, 537, 77, 78, 79, 201, 202, 30/133, 233, 233.5, 30
See application file for complete search history.

(56) References Cited

U.S. PATENT DOCUMENTS 2,618,060 A 11/1952 Giorgi
3,041,726 A * 7/1962 Hitson .................... B26B 19/20 30/201
3,149,418 A * 9/1964 Milbourne .............. B26B 19/20 30/201
3,334,416 A * 8/1967 Green ...................... B26B 19/20 30/200
4,622,745 A 11/1986 Wahl
5,937,526 A 8/1999 Wahl et al.
6,079,103 A * 6/2000 Melton ................... B26B 19/20 30/79

(Continued)

FOREIGN PATENT DOCUMENTS

WO WO-2018177912 A1 * 10/2018 ............. B26B 19/04
WO WO-2022232357 A1 * 11/2022 ............. A45D 24/36

OTHER PUBLICATIONS

International Search Report and Written Opinion received for PCT/US2023/029116, mailed Oct. 18, 2023.

*Primary Examiner* — Ghassem Alie

(74) *Attorney, Agent, or Firm* — Greer, Burns & Crain, Ltd

(57) ABSTRACT

A hair clipper attachment comb is provided for use with a powered hair clipper having a clipper bladeset including a stationary blade and a moving blade reciprocating laterally relative to the stationary blade. The attachment comb has a comb base having a rear edge in operational relationship with the stationary blade and an opposite front edge, the base defining a centerline extending between the rear edge and the front edge. A plurality of comb teeth are provided, each having a tooth base associated with the front edge and a tip opposite the tooth base. The teeth are arranged on the comb to have a nonuniform spacing between adjacent teeth relative to the centerline, such that the spacings of the teeth are bilaterally symmetrical about the centerline.

8 Claims, 6 Drawing Sheets

(56) References Cited

U.S. PATENT DOCUMENTS

| | | | | |
|---|---|---|---|---|
| 7,918,029 | B2 | 4/2011 | Melton et al. | |
| 8,136,253 | B2 * | 3/2012 | Zoot | B26B 19/22<br>30/200 |
| 10,016,903 | B2 | 7/2018 | McCambridge et al. | |
| 10,377,049 | B2 | 8/2019 | Whittaker et al. | |
| D978,430 | S * | 2/2023 | Luo | D28/54 |
| 2008/0005908 | A1 | 1/2008 | Melton et al. | |
| 2009/0019706 | A1 * | 1/2009 | Werner | B26B 19/3813<br>30/233.5 |
| 2014/0352158 | A1 * | 12/2014 | McCambridge | B26B 19/06<br>30/200 |
| 2017/0266823 | A1 * | 9/2017 | Whittaker | B26B 19/20 |
| 2022/0072723 | A1 | 3/2022 | Toy et al. | |

* cited by examiner

HAIR CLIPPER ATTACHMENT COMB WITH ENHANCED HAIR FLOW GEOMETRY

BACKGROUND

The present invention relates generally to attachment combs used with powered hair clippers and trimmers for regulating the length of hair retained by a customer after the hair is cut. More specifically, the present invention relates to an improved hair clipper attachment comb configured for facilitating hair flow for cutting and having an improved attachment comb-hair clipper interface.

Attachment combs are commonly used with powered hair cutting devices such as clippers or trimmers, collectively referred to here as hair clippers. Conventional hair clippers often are supplied with a set of multiple attachment combs of varying sizes. Each size of comb has a plurality of teeth or tines. Lengths of the teeth vary from comb to comb, and all combs of a set typically attach to the clipper near or on the blades using a snap or friction fit provided by clips, tabs or magnets. In some cases, an operator changes attachment combs several times over the course of a haircut or hair styling event, depending on the desired length of hair.

A drawback of conventional combs is that when the person receiving the haircut has long hair, the hair can become clogged between adjacent comb teeth, impairing the cutting action of the hair clipper blades. As hair is cut by the clipper, it is fed through the attachment comb teeth to the blade set, which is attached to the comb at the base portion of the comb. However, in current attachment combs, as the hair is fed through the teeth to the base portion, hair at the base portion often becomes bunched up or backed up, causing the hair to be pushed away from the blade set, preventing the hair from being cut, or from being cut as desired.

Another potential problem encountered by conventional clipper attachment combs is that hair can become caught on the attachment comb due to interference of the comb teeth with the blade set. This causes damage to the hair, and optionally causes the blade set to unnecessarily cut some hair twice if previously cut hair is prevented from exiting the comb.

Yet another drawback of conventional hair clipper attachment combs is that a rear end of the comb teeth, opposite the tip, is closely adjacent the clipper cutting blades, and more specifically, near a cutting line defined by tips of the teeth of the respective stationary and moving blades that make up the clipper bladeset. Each comb tooth at a rear end attaches to a comb base, and an interface area at the rear of the comb defines a hair funneling area that feeds hair to the cutting blades. Such a relationship between the comb teeth and the cutting blades often contributes to the bunching of hair near the cutting blades, impeding the cutting efficiency of the hair clipper.

Accordingly, there is a need for an improved hair clipper attachment comb which addresses the drawbacks listed above.

SUMMARY

The above-listed need is met or exceeded by the present hair clipper attachment comb with improved hair flow geometry. One of the features of the present attachment comb is that the tines or comb teeth are variably spaced from each other along a line parallel to the hair clipper cutting line. In an embodiment, there are multiple spacing distances between adjacent pairs of comb teeth as one progresses from a first side edge to a second side edge of the comb. In a preferred embodiment, there are three separate, distinct comb teeth spacings. In an embodiment, a central pair of comb teeth have a first spacing distance between adjacent teeth, a next-to-central pair of comb teeth have a second spacing distance between adjacent teeth, and a third-to-central pair of comb teeth have a third spacing distance between adjacent teeth. Preferably, the first spacing distance is greater than the second spacing distance, which is greater than the third spacing distance.

Another feature of the present clipper attachment comb is that each comb tooth is provided with chamfered edges for reducing clogging of hair near the clipper bladeset and enhancing hair flow through the comb. A rear edge of each comb tooth rear end is tapered, with chamfered edges that promote hair flow due to the removal of sharp corners in this area. In one embodiment, the rear ends are multi-faceted, with inwardly angled side edges tapered toward a tooth centerline. Ridge edges of the comb teeth are also preferably chamfered from the rear edge to the comb tooth tip. Further, the front edge of the attachment comb base adjacent the comb teeth rear ends defines a rounded or "U"-shape between adjacent teeth, and a radius of the base of the "U" varies with the respective tooth spacing.

Still another feature of the present clipper attachment comb is that the rear edges of the comb teeth define a comb tooth line that is parallel to, and spaced from the hair clipper cutting line along an axis of the hair clipper housing. A gap defined between the comb tooth line and the cutting line promotes the flow of hair through the hair clipper bladeset.

More specifically, a hair clipper attachment comb is provided for use with a powered hair clipper having a clipper bladeset including a stationary blade and a moving blade reciprocating laterally relative to the stationary blade. Included on the attachment comb is a comb base having a rear edge in operational relationship with the stationary blade and an opposite front edge, the base defining a centerline extending between the rear edge and the front edge. A plurality of comb teeth is provided, each having a tooth base associated with the front edge and a tip opposite the base. The teeth are arranged on the comb to have a nonuniform spacing between adjacent teeth relative to the centerline, such that the spacings of the teeth are bilaterally symmetrical about the centerline.

In an embodiment, the comb tooth spacing distances decrease from the centerline to a side edge of the attachment comb.

In a preferred embodiment, the variable spacing between the comb teeth includes a first spacing distance for a first pair of the teeth straddling the centerline, a second spacing distance for second pairs of the teeth next adjacent the centerline; and a third spacing distance for third pairs of the teeth next adjacent the second pairs of the teeth. In an embodiment, the first spacing distance is greater than the second spacing distance, which is greater than the third spacing distance. In an embodiment, the first, second and third spacing distances are different from each other.

In an embodiment, each comb tooth is provided with chamfered edges for reducing clogging of hair near the clipper bladeset and enhancing hair flow through the comb. In a preferred embodiment, a rear edge of each comb tooth rear end is at least one of tapered and multi-faceted. In an embodiment, the tooth rear end has inwardly angled side edges tapered toward a tooth centerline. In an embodiment, ridge edges of the comb teeth are chamfered from the rear edge to the tooth tip.

In an embodiment, the front edge of the attachment comb base adjacent the comb teeth rear ends defines a rounded or "U"-shape between adjacent teeth, and a radius of the base of the "U" varies with the respective tooth spacing. In an embodiment, rear edges of each comb tooth define a line in spaced parallel relationship to a cutting line defined by the clipper bladeset.

In another embodiment, a hair clipper attachment comb is provided for use with a powered hair clipper having a clipper bladeset including a stationary blade and a moving blade reciprocating laterally relative to the stationary blade. Included on the attachment comb is a comb base having a rear edge in operational relationship with the stationary blade and an opposite front edge, and a plurality of comb teeth each having a tooth base associated with the front edge and a tip opposite the base. Each comb tooth is provided with chamfered edges for reducing clogging of hair near the clipper bladeset and enhancing hair flow through the comb. Preferably, a rear edge of each comb tooth rear end is at least one of tapered and multi-faceted.

In still another embodiment, a hair clipper attachment comb is provided for use with a powered hair clipper having a clipper bladeset including a stationary blade and a moving blade reciprocating laterally relative to the stationary blade. Included on the attachment comb is a comb base having a rear edge in operational relationship with the stationary blade and an opposite front edge. A plurality of comb teeth is provided, each having a tooth base associated with the front edge and a tip opposite the base. Rear edges of each comb tooth define a line in spaced parallel relationship to a cutting line defined by the clipper bladeset.

DETAILED DESCRIPTION

Figure 1:
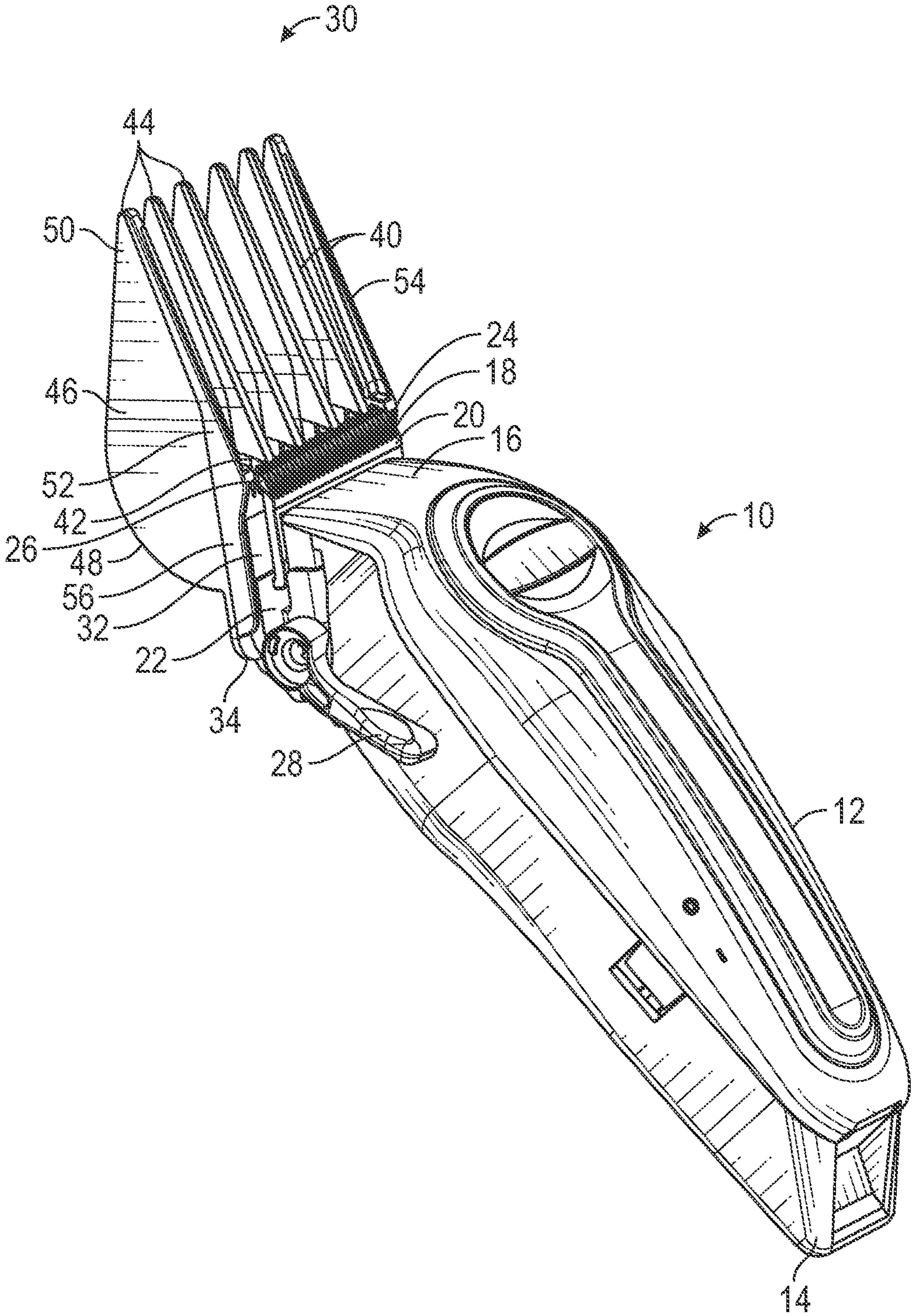
FIG. 1 is a top perspective view of a hair clipper equipped with the present attachment comb.
Figure 2:
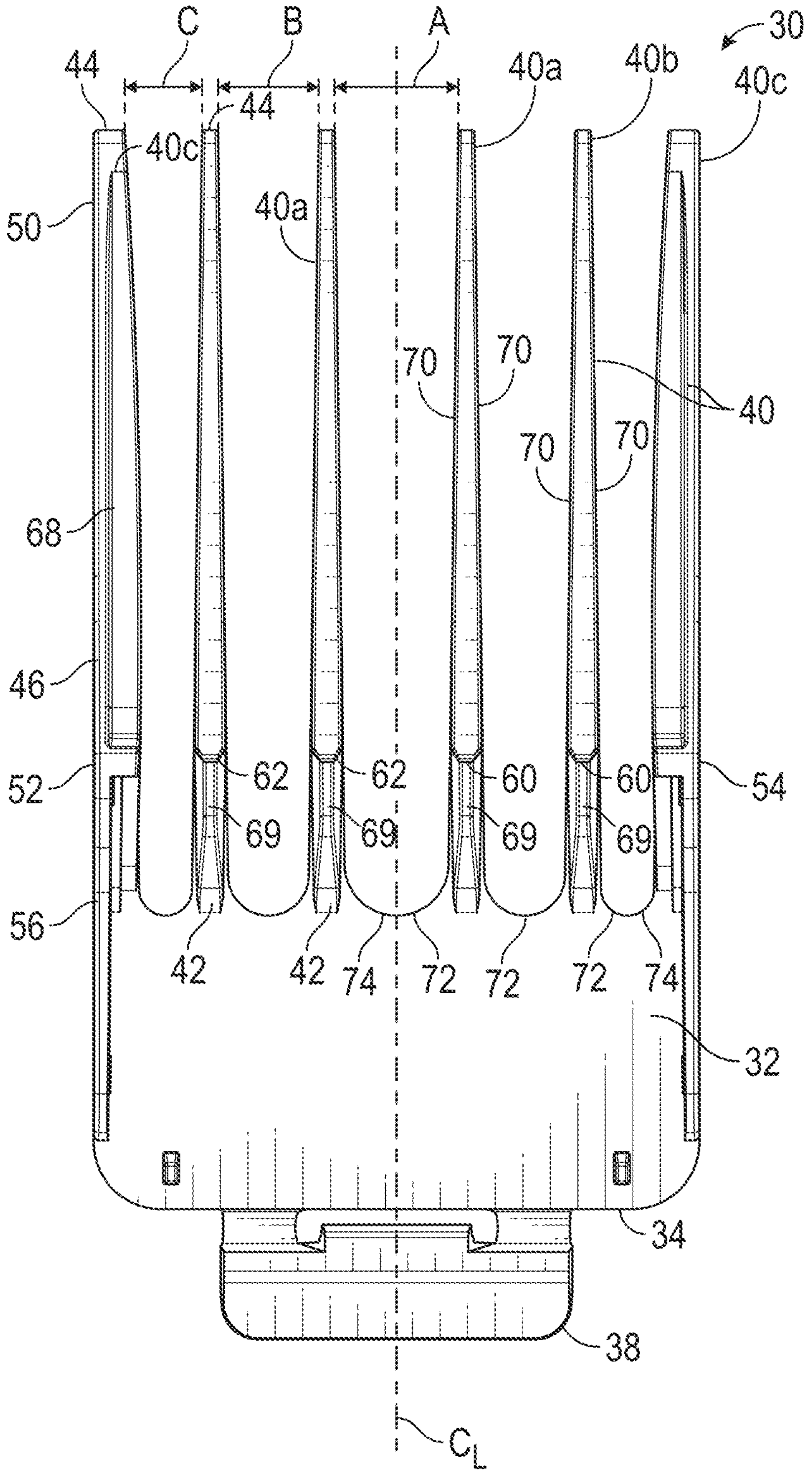
FIG. 2 is a top view of the present attachment comb.
Figure 3:
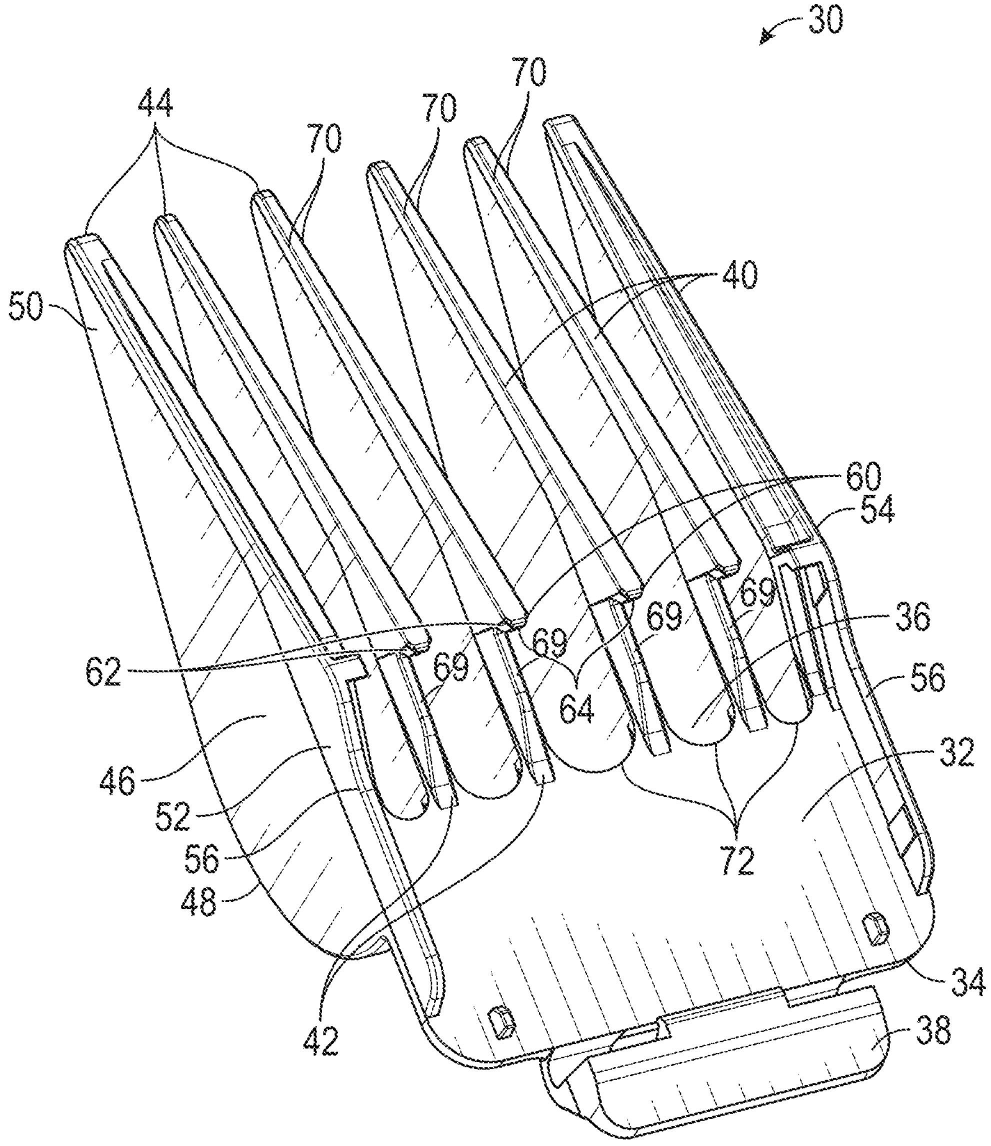
FIG. 3 is a top perspective view of the attachment comb of FIG. 2.

Referring now to FIGS. 1-3, a powered hair clipper is generally designated 10, and includes a clipper housing 12 having a rear end 14 and an opposite blade end 16. Enclosed by the housing is a power source such as an electric motor, powered by line current or battery, and a transmission assembly which converts rotary motion of the motor to linear motion. The transmission assembly is connected to a bladeset 18 for moving a laterally reciprocating moving blade 20 relative to a stationary blade 22. Preferably, the bladeset 18 is removably mounted to the clipper housing 12 for maintenance. Each of the moving blade 20 and the stationary blade 22 have a corresponding set of teeth 24, 26. An adjustment lever 28 is optionally provided for adjusting the relative position of the respective teeth 24, 26 as desired for a variety of hair cutting styles.

A hair clipper attachment comb is generally designated 30 and is releasably attached to the clipper bladeset 18 by a user for regulating the length of hair to be cut by the hair clipper 10. Attachment combs are often provided in sets having combs of varying lengths to provide hair stylists with a wide range of options of desired hair lengths. The depicted attachment comb 30 is contemplated as being provided in a variety of sizes, however, each size is envisioned as having the construction described herein. Included on the comb 30 is a comb base 32 having a rear edge 34 in operational relationship with the stationary blade 22 and an opposite front edge 36. An attachment comb centerline $C_L$, is defined on the comb base 32 and extends at least between the rear edge 34 and the front edge 36. As seen in FIG. 2, the centerline $C_L$ preferably extends beyond the front edge 36.

The attachment comb 30 is configured for being releasably attached to the bladeset 18, and specifically to the stationary blade 22. As such, a clip 38 extends from the rear edge 34 and is constructed and arranged for engaging the stationary blade 22. Alternate comb fastening devices are contemplated, including but not limited to magnets and designated brackets. Preferably, the clip 38 is integrally molded with the attachment comb 30 as from injection molded plastic, however a separate clip secured by fasteners or chemical adhesive is also contemplated.

A plurality of comb teeth or tines 40 are each attached to the comb base 32, each tooth having a tooth base 42 associated with the comb base front edge 36 and a tip 44 opposite the base. Between the tooth base 42 and the tip 44, each tooth 40 defines a sidewall 46 with a radiused end 48 adjacent the comb base and a tapered end 50 adjacent the tip 44. Also, first and second side edges 52, 54 of the comb 30 include vertically extending supports 56 configured for enhancing comb strength and directing the flow of hair into the clipper bladeset 18.

Referring now to FIG. 2, a feature of the present attachment comb 30 is that the comb teeth 40 are arranged on the comb to have a variable spacing between adjacent teeth relative to the centerline $C_L$. Preferably, this variable spacing includes multiple distinct spacing distances between adjacent pairs of the comb teeth 40. In one embodiment, distances between adjacent pairs of the comb teeth 40 vary as one progresses from the first side edge 52 to the second side edge 54. Also, the various spacing distances are different from each other. Further, it is preferred that the comb teeth 40 are arranged on the attachment comb 30 to have a nonuniform spacing between adjacent teeth relative to the centerline $C_L$, such that the spacings of the teeth are bilaterally symmetrical about the centerline. In other words, the tooth spacings on either side of the centerline C L are mirror images of each other. Also, it is preferred that the comb tooth spacing distances progressively decrease from the centerline C L to each corresponding side edge 52, 54 of the attachment comb 30.

In a particularly preferred embodiment, the variable spacing between the comb teeth 40 includes a first spacing distance "A" for a first pair of the teeth 40_a_ straddling or on each side of the centerline $C_L$, a second spacing distance "B" for second pairs of the teeth 40_b_ moving away from the centerline, next adjacent or on either side of the teeth 40_a_, and a third spacing distance "C" for third pairs of the teeth 40_c_ moving further away from the centerline next adjacent or on either side of the second pairs of the teeth 40_b_. It is seen that in the preferred comb 30, the teeth 40_c_ are also the outermost teeth on the comb. It is contemplated that fewer or additional teeth are provided in the comb 30 depending on the application. While the respective tooth spacing distances "A," "B" and "C" are contemplated as varying to suit the application, in the preferred embodiment, the first tooth spacing distance "A" is greater than the second distance "B" which is greater than the third distance "C". In other words, the tooth spacing distances vary relative to each other, and also decrease as one moves away from the centerline $C_L$.

Since a cutting force of the hair clipper 10 generated at the bladeset 18 is highest at the centerline $C_L$, and gradually declines as one moves from the centerline towards the side edges 52, 54, the present comb 30 with the above-described tooth spacings "A," "B" and "C" allows more hair to be fed into the bladeset 18 near the centerline for more efficient clipper operation. As one moves laterally away from the centerline $C_L$ towards the edges 52, 54, the variable comb tooth spacing accommodates the gradually reduced cutting force by gradually limiting the amount of hair fed to the bladeset 18 at that point.

Figure 4:
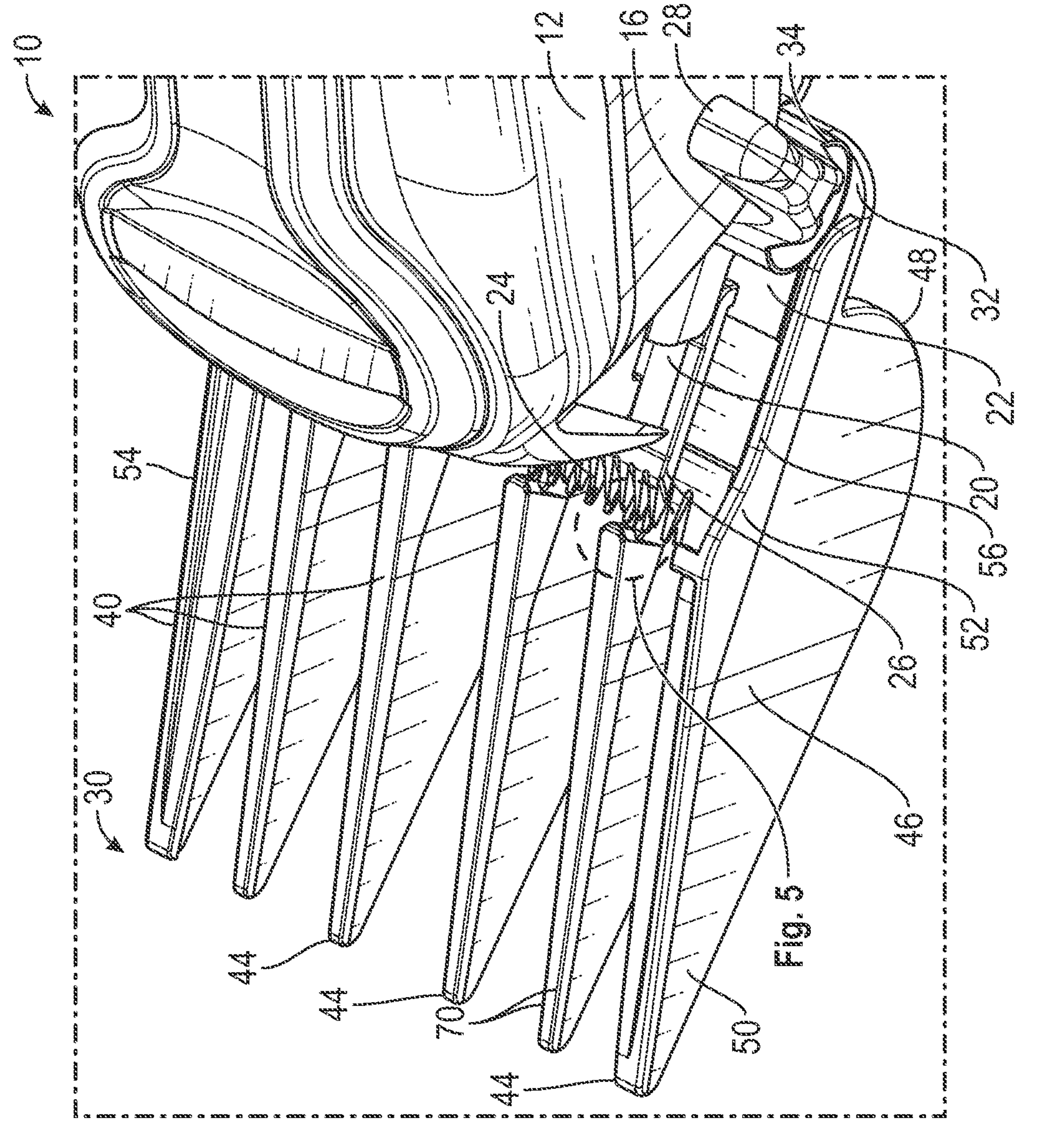
FIG. 4 is a fragmentary top perspective view of the interface between the hair clipper bladeset and the present attachment comb.
Figure 5:
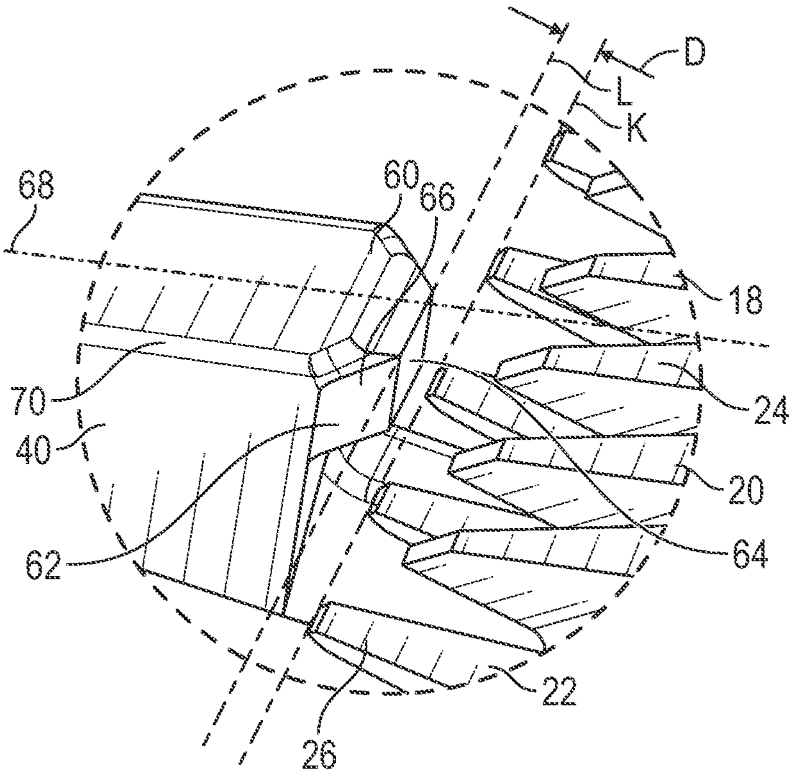
FIG. 5 is an enlarged fragmentary top perspective of the view attachment comb/hair clipper bladeset interface of FIG. 4.
Figure 6:
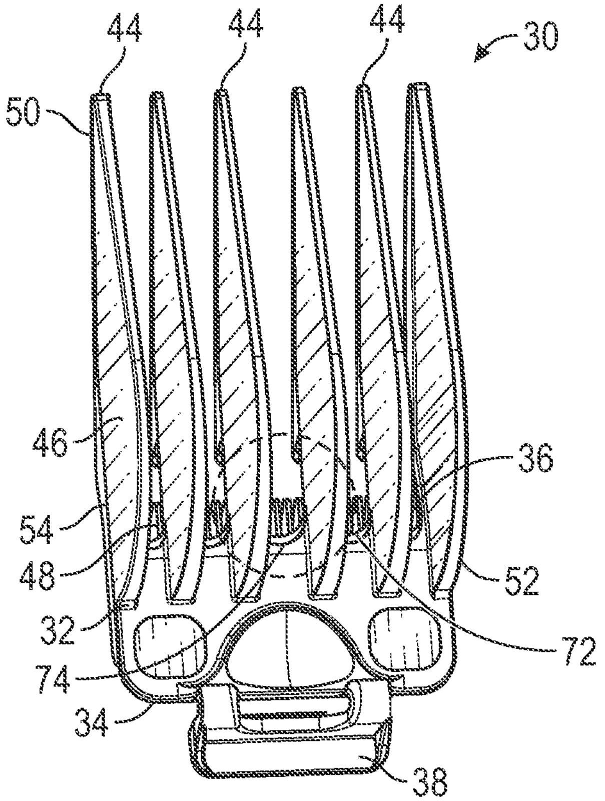
FIG. 6 is a bottom perspective view of the present attachment comb.
Figure 7:
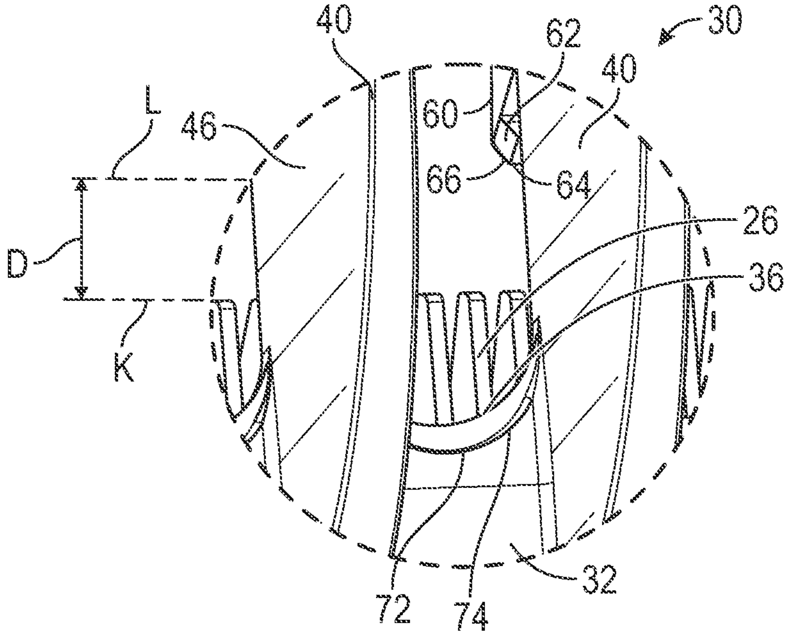
FIG. 7 is an enlarged fragmentary view of the attachment comb of FIG. 6.

Referring now to FIGS. 3-5, another feature of the present hair clipper attachment comb 30 is that each tooth 40 and particularly, rear ends 60 of each comb tooth are provided with chamfered edges 62 for reducing clogging of hair near the clipper bladeset 18 and for enhancing hair flow through the comb by creating a funneling effect. In operation, the funneling effect promotes hair flow to spaces between the comb teeth 40. More specifically, a rear edge 64 of each comb tooth 40 has corners removed and replaced with tapered or multi-faceted portions 66. Such angled portion 66 are inwardly angled and tapered toward a tooth centerline 68 which is distinct from, but parallel to the comb centerline $C_L$. Also, each comb tooth 40 has an inclined surface 69 extending gradually upwardly from the tooth base 42, adjacent the comb base 32 and towards the comb tooth rear end 60.

Further hair flow enhancement in the comb 30 is provided by also chamfering ridge edges 70 of each comb tooth 40 that extend from the rear edge 64 to the tips 44. The chamfering of the ridge edges 70 is contemplated as including a beveled or radiused edges for reducing friction with the hair moving through the comb 30 to be cut by the bladeset 18.

Referring now to FIGS. 2 and 3, hair flow through the present attachment com 30 is also enhanced by providing the front edge 36 of the comb base 32 adjacent the comb teeth rear ends 60 with a configuration that defines a rounded or "U"-shape at 72, and preferably a radius of a base 74 of the "U" varies with the respective tooth spacing. As such, the radii of the base 74 decrease with distance from the centerline $C_L$ and as one approaches the side edges 52, 54.

Referring now to FIGS. 4-7, hair flow through the present attachment comb 30 is further enhanced by a configuration where the rear edges 64 of each comb tooth 40 define a line "L" (FIG. 5) in spaced parallel relationship to a cutting line ("K") defined by the clipper bladeset 18. It is particularly preferred that the cutting line "K" is defined by tips of the stationary blade 22. A gap or spacing or distance "D" between the lines "L" and "K" varies with the application, but is contemplated as being in the range of 0.0625 to 0.25 inch.

While a particular embodiment of the present hair clipper attachment comb with improved hair flow geometry has been described herein, it will be appreciated by those skilled in the art that changes and modifications may be made thereto without departing from the invention in its broader aspects and as set forth in the following claims.

The invention claimed is:

1. A hair clipper attachment comb for use with a powered hair clipper having a clipper bladeset including a stationary blade and a moving blade reciprocating laterally relative to the stationary blade, said attachment comb comprising:

a comb base having a rear edge in operational relationship with the stationary blade and an opposite front edge, said base defining a centerline extending between said rear edge and said front edge;

a plurality of comb teeth each having a tooth base associated with said front edge and a tip opposite said tooth base;

said teeth being arranged on said comb to have a non-uniform spacing between adjacent teeth relative to said centerline, such that said spacings between said teeth are bilaterally symmetrical about said centerline;

said spacing between said comb teeth includes a first spacing distance for a first pair of said teeth straddling said centerline, a second spacing distance for second pairs of said teeth next adjacent said first pair of teeth; and a third spacing distance for third pairs of said teeth next adjacent said second pairs of said teeth, said first, second and third spacing distances decrease progressively from said centerline;

said front edge of said attachment comb base adjacent comb teeth rear ends defines between adjacent teeth "U"-shape, and a radius of a base of the "U" is reduced correspondingly from said centerline with the decreased tooth spacing progressively from said centerline;

each said comb has an inclined surface extending gradually upwardly from said tooth base adjacent said comb base and towards said comb tooth rear end; and said rear edges of each said comb define a line in spaced relationship to a cutting line defined by the clipper bladeset, a distance between said line and said cutting line being in the range of 0.0625 to 0.25 inch for enhancing a flow of hair through said attachment comb.

2. The attachment comb of claim 1, wherein said first spacing distance is greater than said second spacing distance, which is greater than said third spacing distance.

3. The attachment comb of claim 1, wherein said first, second and third spacing distances are different from each other.

4. The attachment comb of claim 1, wherein each comb tooth is provided with chamfered edges for reducing clogging of hair near the clipper bladeset and enhancing hair flow through the comb.

5. The attachment comb of claim 4, wherein a rear edge of each comb tooth rear end is at least one of tapered and multi-faceted.

6. The attachment comb of claim 4, wherein ridge edges of each said comb tooth are chamfered from a rear edge to a tip.

7. The attachment comb of claim 1, wherein rear edges of each said comb tooth define a line in spaced parallel relationship to a cutting line defined by the clipper bladeset, a distance between said line and said cutting line being in the range of 0.0625 to 0.25 inch for enhancing a flow of hair through said attachment comb.

8. A hair clipper attachment comb for use with a powered hair clipper having a clipper bladeset including a stationary blade and a moving blade reciprocating laterally relative to the stationary blade, said attachment comb comprising:

a comb base having a rear edge in operational relationship with the stationary blade and an opposite front edge;

a plurality of comb teeth each having a tooth base associated with said front edge and a tip opposite said tooth base;

each comb tooth is provided with chamfered edges for enhancing hair flow through the comb;

a rear edge of each comb tooth rear end adjacent said chamfered edges is tapered and multi-faceted, such that said tooth rear end has a pair of inwardly angled side edges tapered toward a tooth centerline;

a spacing between said comb teeth includes a first spacing distance for a first pair of said teeth straddling said centerline, a second spacing distance for second pairs of said teeth next adjacent said first pair of teeth; and a third spacing distance for third pairs of said teeth next adjacent said second pairs of said teeth, said first, second and third spacing distances decrease progressively from said centerline said front edge of said attachment comb base adjacent said comb teeth rear ends define a "U"-shape, and a radius of a base of the "U" decreases progressively from said centerline in conjunction with said tooth spacing;

said rear edges of each said comb define a line in spaced parallel relationship to a cutting line defined by the clipper bladeset, a distance between said line and said cutting line being in the range of 0.0625 to 0.25 inch for enhancing a flow of hair through said attachment comb; and each said comb tooth has an inclined surface extending gradually upwardly from said tooth base adjacent said comb base and towards said comb tooth rear end.

* * * * *